United States Patent [19]

Burow

[11] Patent Number: 4,734,136

[45] Date of Patent: Mar. 29, 1988

[54] HEAT RESISTANT YELLOW PIGMENTS, PROCESSES FOR THEIR PREPARATION AND THEIR USE

[75] Inventor: Wilfried Burow, Krefeld, Fed. Rep. of Germany

[73] Assignee: Bayer Aktiengesellschaft, Leverkusen, Fed. Rep. of Germany

[21] Appl. No.: 923,226

[22] Filed: Oct. 27, 1986

[30] Foreign Application Priority Data

Nov. 6, 1985 [DE] Fed. Rep. of Germany ....... 3539306

[51] Int. Cl.$^4$ ............................................. C04B 14/00
[52] U.S. Cl. ...................................... 106/304; 106/309
[58] Field of Search ................................. 106/304, 309

[56] References Cited

U.S. PATENT DOCUMENTS

| | | | |
|---|---|---|---|
| 4,036,662 | 7/1977 | Rademachers et al. | 106/304 |
| 4,053,325 | 10/1977 | Vanderheiden | 106/304 |
| 4,309,480 | 1/1982 | Armanini | 106/304 |
| 4,374,677 | 2/1983 | Senda et al. | 106/309 |
| 4,376,656 | 3/1983 | Senda et al. | 106/309 |

*Primary Examiner*—Paul Lieberman
*Assistant Examiner*—Willie J. Thompson
*Attorney, Agent, or Firm*—Connolly & Hutz

[57] ABSTRACT

Heat resistant iron oxide yellow pigments containing aluminium compounds of the formular $(AlO)_xPO_4(OH)_{x-3}$ where x is a value from 3 to 10 is prepared by applying the aluminum compund to an iron oxide pigment and is useful as a coloring agent in lacquers and synthetic thermoplastic materials.

12 Claims, 2 Drawing Figures

HEAT RESISTANT YELLOW PIGMENTS, PROCESSES FOR THEIR PREPARATION AND THEIR USE

The present invention relates to new iron oxide pigments with improved heat resistance containing aluminium compounds, to processes for their preparation and their use.

BACKGROUND OF THE INVENTION

Heat resistant pigments are required for coloring synthetic materials, in the paper industry and in coil coat systems in the lacquer industry. The yellow pigments used are mainly lead chromates and cadmium sulphides but compounds containing bismuth, vanadium and molybdenum are also used. One disadvantage of these heat resistant yellow pigments is their high cost. There is, therefore, a demand for replacing them by less expensive pigments.

Iron oxide yellow pigments which have an intense color and are chemically resistant and highly weather resistant would be possible substitutes but the usual iron oxide yellow pigments are only of limited use as heat resistant yellow pigments since they change their color to reddish brown at temperatures above 200° C. due to decomposition to $\alpha$-$Fe_2O_3$.

If they are to be widely used as heat resistant yellow pigments, they should be suitable for use not only in the paper industry and in coil coat systems but especially also as coloring agents in thermoplastic synthetic materials which are processed at high temperatures.

Table 1 gives the usual processing temperatures employed for thermoplastic synthetic materials.

TABLE 1

Processing temperatures of thermoplastic synthetic materials

| Synthetic material | Processing Temperature |
| --- | --- |
| Polyvinyl chloride | from 160° C. |
| HD-polyethylene | from 240° C. |
| Polypropylene | from 260° C. |
| Styrene polymer | from 220° C. |
| Polyamide | from 230° C. |
| Polycarbonates | from 300° C. |

It has long been attempted to improve the heat resistance of iron oxide yellow by coating the pigments. GERMAN Pat. No. 2,740,861 and U.S. Pat. No. 4,053,325 describe the coating of iron oxide pigments with up to 20% by weight of a metal metaphospate having the composition $Al(PO_3)_3$, $Fe(PO_3)_3$, $Ca(PO_3)_2$, $Ba(PO_3)_2$ but the heat resistance achieved is only up to a temperature of about 230° C.

Other processes for coating iron oxide yellow serve to provide protection against sintering during the subsequent dehydration to $\alpha$-$Fe_2O_3$, reduction to $Fe_3O_4$ and oxidation to $\gamma$-$Fe_2O_3$. The starting material used for these processes is needle shaped $\alpha$-FeOOH in which processes the needle shape is required to be preserved over several reaction stages up to needle shaped $Fe_3O_4$ or $\gamma$-$Fe_2O_3$ and protected against sintering.

The after treatments proposed, namely the application of up to 5% by weight of silicone oil, 2% by weight of Fe, Cr, Mn, Al, Ga, In, La, Ce, rare earths (GERMAN Pat. No. 2,339,142) or 0.1 to 5% by weight of oxides or phosphates of Zn, Al, Ce, Cr, Fe, Mn, Sb, Sn, Ti, Zr (GERMAN Pat. No. 2,507,420) and 0.1 to 6% by weight of phosphate (GERMAN Pat. No. 1,592,214) must not prevent the dehydration of $\alpha$-FeOOH to $\alpha$-$Fe_2O_3$ but should serve solely as protection against sintering. These coating processes are unsuitable for the preparation to sufficiently heat resistant yellow pigments. Their starting materials are preliminary products for the preparation of magnetic pigments and are coloristically unsuitable for use as yellow pigments.

Since no iron oxide yellow pigments having sufficient heat resistance for general use have hitherto been obtained by conventional methods, it has repeatedly been proposed (U.S. Pat. No. 4,376,677, JAPAN Pat. No. 53,102,298, U.S. Pat. No. 4,376,656) to produce heat resistant iron oxide yellow pigments by hydrothermal processes.

The hydrothermal processes proposed, which in the case of U.S. Pat. Nos. 4,376,677 and 4,376,656 comprise two successive hydrothermal syntheses, are uneconomical.

They partly lead to pigments containing only a minor proportion of iron ions (U.S. Pat. No. 4,376,677, example 1; about 66 mol % Al, 33 mol % Fe, 1 Mol % si) and, therefore, only have a weak color.

The present invention therefore relates to the preparation of an iron oxide yellow pigment with improved heat resistance which does not have the disadvantages of the described pigments belonging to the state of the art.

BRIEF DESCRIPTION OF THE INVENTION

Pigments which fulfil these requirements to an exceptionally high degree have now surprisingly been found and they constitute the subject of the present invention.

The present invention relates to heat resistant iron oxide yellow pigments containing aluminium compounds, the aluminium compounds having the formula $(AlO)_x PO_4 (OH)_{x-3}$ where x is from 3 to 10.

DETAILED DESCRIPTION

Figure 1:
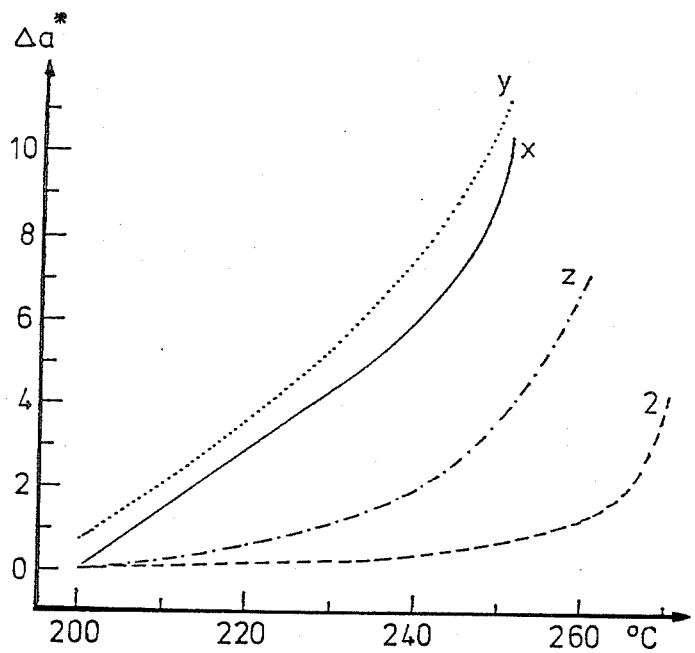

The aluminium compounds employed in conjunction with iron oxide are known as basic aluminium phosphates.

Particularly preferred improved iron oxide yellow pigments according to the invention are those in which the quantity of aluminium compound amounts to 7.5 to 25% by weight. The improved iron oxides according to the invention have excellent heat resistance even at temperatures above 250° C.

It is, therefore, not necessary to mass dope the $\alpha$-FeOOH pigment with the aluminium compounds according to the invention in order to stabilize it. High heat resistances are obtained even when the aluminium compound is present merely as a coating.

The coatings according to the invention corresponding to the formula $(AlO)_x PO_4 (OH)_{x-3}$ with a molar ratio of Al:P in the range of 3 to 10:1 provide better heat resistance than that obtained with coatings containing aluminum phosphates, namely $AlPO_4$ (molar ratio Al:P=1:1), $Al_4(P_2O_7)_3$ (molar ratio Al:P=1:1.5) or $Al(PO_3)_3$ (molar ratio Al:P=1:3) or that obtained with a coating of pure $Al_2O_3$.

Those iron oxide yellow pigments according to the invention in which the coating contains sparingly soluble compounds of Al and P with a molar ratio of Al:P in the range of 3 to 10, an Al content of 4.5 to 9% by weight and a P contents of 0.6 to 4% by weight are particularly preferred.

The heat resistance of the iron oxide yellow pigments according to the invention is sufficient for their general use in the paper industry, in coil coat systems and for coloring thermoplastic synthetic materials.

These iron oxide pigments are obtainable by an inexpensive, environmentally compatible process.

The present invention thus also relates to a process for the preparation of the pigments according to the invention.

Any processes leading to $(AlO)_x PO_4 (OH)_{x-3}$ where x is from <3 to 10 may be used for the preparation of these pigments. These processes include grinding the substances together, spraying, coprecipitation or precipitation on the surface, surface precipitation of the coating being preferred.

According to the invention, therefore, the process of preparation is carried out by precipitation, hydrothermal synthetsis, grinding or spraying of aluminium compounds of the formula $(AlO)_x PO_4 (OH)_{x-3}$ where $10 \geq x \geq 3$, on an iron oxide yellow pigment.

That embodiment of the process in which an iron oxide yellow pigment is coated with aluminium compounds of the formula $(AlO)_x PO_4 (OH)_{x-3}$ where $10 \geq x \geq 3$ by precipitation, hydrothermal treatment, grinding or spraying is preferred.

The coating process may easily be carried out by adding solutions of water soluble aluminium compounds and water soluble compounds of orthophosporic acid simultaneously or successively to an α-FeOOH yellow suspension of a commercial iron oxide yellow pigment in propertions conforming to the stoichiometry of $(AlO)_x PO_4(OH)_{x-3}$. The quantities of aluminium and phosphoric acid compounds should also be so chosen that after precipitation on the iron oxide yellow pigment they form a coating amounting to at least 7.5% by weight of the coated iron oxide yellow pigment. During and after addition of the solutions containing Al and P, the iron oxide yellow suspension must be mixed sufficiently thoroughly to ensure the formation of a uniform coating. Precipitation takes place at room temperature or higher and normally takes at least half an hour. The pH measured at the end of precipitation should be at least 6 and the value may have to be adjusted by the addition of alkalis. A pH above 7 is preferred. After precipitation, the coated iron oxide yellow pigment is washed, dried and ground.

According to a particular embodiment of the invention, coating may be carried out with a hydrothermal step. Only one hydrothermal treatment is necessary and the product is worked up in the usual manner by washing, drying, and grinding.

The water soluble aluminium compounds used may be aluminium salts such as aluminium chloride, sulphate or nitrate or aluminates such as sodium or potassium aluminate. Examples of suitable water soluble orthophosphoric acid compounds include $Na_3PO_4$, $Na_2HPO_4$, $NaH_2PO_4$, $H_3PO_4$, $K_3HPO_4$, $KH_2PO_4$, $KH_3PO_4$ and other salts of ortho-phosphoric acid. The alkalis added may be hydroxides or carbonates of alkali metals and alkaline earth metals as well as ammonia and amines.

In a preferred, environmentally compatible embodiment of the precipitation process, the phosphorus component is $H_3PO_4$ and the aluminium component used is mainly $NaAl(OH)_4$.

In this embodiment, the by-product salt produced in the reaction, e.g. $Na_2SO_4$, is reduced to a minimum compared with that formed in the usual processes using, for example, $Al_2(SO_4)_3$, $Na_3PO_4$ and NaOH as reactants, as may be seen from equations (1) and (2):

(1) Process using sodium phosphate

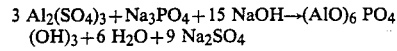

$3 Al_2(SO_4)_3 + Na_3PO_4 + 15 NaOH \rightarrow (AlO)_6 PO_4 (OH)_3 + 6 H_2O + 9 Na_2SO_4$ (2) Preferred process according to the invention

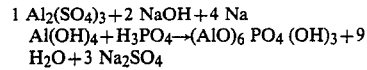

$1 Al_2(SO_4)_3 + 2 NaOH + 4 Na Al(OH)_4 + H_3PO_4 \rightarrow (AlO)_6 PO_4 (OH)_3 + 9 H_2O + 3 Na_2SO_4$ The present invention also relates to the use of the heat resistant iron oxide yellow pigments according to the invention in lacquer systems, in particular in stoving lacquers (coil coating), in the paper industry, for coloring synthetic materials and as corrosion protective pigments. Of course, the improved iron oxide yellow pigments of this invention are useful to pigment or color other compositions where a high heat resistance is necessary.

Preparation of the iron oxide yellow pigments is described in the examples which follow. The examples serve to illustrate the process and do not limit it.

EXAMPLES

Appartus 5 liter stirrer vessel with electric stirrer, electric and steam heating, temperature and pH measuring devices, 3 dosing pumps, and a 2 liter autoclave equipped with electric heating and temperature and pressure measuring devices.

Raw Materials

Starting material in reaction vessel: 2.0 liters of iron oxide yellow suspension (Bayferrox ® 420) trade product of Bayer AG containing 2.5 mol FeOOH per liter. Solutions:

A. commercial aluminium sulphate solution (2 mol Al/l)

B. commercial orthophosphoric acid (9.784 mol $H_3PO_4$/l)

C. sodium aluminate solution (6 mol Al/l and 9 mol Na/l)

D. commercial tetrasodium diphosphate (0.2 mol $Na_4P_2O_7$/l)

E. sodium hydroxide solution (17.5 mol NaOH/l)

EXAMPLES 1–5

The quantities of solutions, A, B and C given in Table 2 below are added simultaneously from 3 dosing pumps to the iron oxide yellow suspension in the reaction vessel within 30 minutes at room temperature (25°) with vigorous stirring. Stirring is continued for a further 30 minutes after the solutions have been added. In Example 3, the suspension obtained is heated to 180° C. in an autoclave and kept at 180° C. and about 10 bar for 2 hours.

The yellow suspensions obtained are washed until free from salt, dried and ground.

COMPARISON EXAMPLES A–C

The quantities of solutions A and E given in Table 2 are added simultaneously from two dosing pumps to the iron oxide yellow suspension in the reaction vessel within 30 minutes at room temperature (25° C.) with vigorous stirring. The product is worked up as in Example 1 to 5.

COMPARISON EXAMPLES D AND E

Solution D (Table 2) is added with a dosing pump to the iron oxide yellow suspension in the course of 1 hour at room temperature (25° C.) with vigorous stirring, and stirring is then continued for 1 hour. In Example E, the suspension is subjected to a hydrothermal treatment (2 hours 180° C., about 10 bar) after the addition of solution D. The product is worked up as in Examples 1 to 5.

COMPARISON EXAMPLE F

Solutions A, B and E are added simultaneously from 3 dosing pumps in the quantities given in table 2 to the iron oxide yellow suspension in the reaction vessel at room temperature (25° C.) with vigorous stirring, and the reaction mixture is then stirred for a further 30 minutes. The product is worked up as in Examples 1 to 5.

TABLE 2

Quantities of solution for the iron oxide yellow treatment

| Ex- am- ple | Solutions (ml) A | B | C | D | E | After treatment Contents (g/100 g FeOOH) Al$_2$O$_3$ | P$_2$O$_5$ | Molar ratio Al:P |
|---|---|---|---|---|---|---|---|---|
| 1 | 175.6 | 21.5 | 116.9 | — | — | 12.08 | 3.36 | 5 |
| 2 | 206.6 | 22.55 | 151.6 | — | — | 15.18 | 3.52 | 6 |
| 3 | 206.6 | 22.55 | 151.6 | — | — | 15.18 | 3.52 | 6 |
| 4 | 233.4 | 23.8 | 155.1 | — | — | 16.04 | 3.72 | 6 |
| 5 | 113.8 | 7.0 | 75.9 | — | — | 7.84 | 1.09 | 10 |
| A | 435.0 | — | — | — | 149.0 | 10 | — | — |
| B | 654.0 | — | — | — | 225.0 | 15 | — | — |
| C | 872.0 | — | — | — | 299.0 | 20 | — | — |
| D | — | — | — | 444.0 | — | — | 2.84 | — |
| E | — | — | — | 1774.0 | — | — | 11.34 | — |
| F | 182 | 37.2 | — | — | 62.5 | 4.18 | 5.82 | 1 |

The products of Examples 1 to 5 prepared according to the invention and the products of Examples A to F were tested for their heat resistance together with trade products, namely Mapico ® LL-XLO, an iron oxide yellow of Mapico, Japan, Bayferrox ® 920, an iron oxide yellow of Bayer AG, and Mapico ® 1000 HRA, a heat stabilized iron oxide yellow pigment of Mapico, Japan.

The heat resistance of the yellow pigment can easily be determined by subjecting the pigment to a heat treatment in a circulating air drying cupboard. The quantity of the sample in the porcelain dish should be 5 g and the dwell time at the test temperature should be 30 minutes. The lowest test temperature employed is 200° C. and the temperature is raised by steps of 10° C. The temperature at which the pigments under investigation first show a marked color change to red is determined.

Determination of heat resistance by injection moulding."

10 g of the yellow pigment to be tested and 1 kg of a high density, uncolored polyethylene granulate, a thermoplastic synthetic material Vestolen ® A 6016, trade product of CWH (Chemische Werke Hüls) are mixed together in a glass bottle on a roller block for 20 minutes. The mixture is then worked up in a double screw extruder with granulating device to produce a uniformly colored test granulate. The test granulate is dried at 70° C. for 4 hours.

The colored, platelet shaped samples used for testing the heat resistance (planar surface, at least 2.5 mm in thickness, suitable for color determination) are prepared in a screw injection moulding machine of the type Arburg 200 Allrounder, manufacturers Arburg, Lossburg (Schwarzw.) with appropriate injection moulding apparatus. The contents of the screw are sufficient to produce 5 samples. The injection moulding apparatus is equipped with an electric temperature measuring instrument with a temperature probe for measuring the temperature in the melt.

The machine is filled with test granulate and heated to 200° C., 12 plates (samples) are extruded and discarded. When a temperature of 200° C. is reached, 5 plates are moulded and numbered as samples 1 to 5. They are used as comparison or reference samples for the subsequent temperature stages. The test temperature or injection moulding temperature is then raised by intervals of 20° C. (or 10° C.). During the period of heating up to the next test temperature, 6 plates are moulded and discarded. When the test temperature has been reached, the moulding cycle is interrupted and the melt with the iron oxide yellow pigment contained in it subjected to this temperature for 5 minutes. 5 plates (samples) are then moulded and numbered. The temperature is then adjusted to the next higher level in the same manner and the process repeated, (5 minutes exposure to test temperature followed by injection moulding of 5 samples). The test temperature continues to be raised by 20° C. (or 10° C.) until streaks are clearly formed on the samples or a color change to red is observed. Plates 2 and 3 are used for assessing the heat resistance and compared with the samples moulded at 200° C.

A simple visual determination may be carried out. The highest possible injection moulding temperature is determined at which the sample plates are still free from streaks and, compared with samples moulded at 200° C., show no color change to red.

According to DIN 53,772 (determination of heat resistance by injection moulding), the samples are tested colorimetrically according to DIN 53,235 and DIN

TABLE 3

Colour change temperature of iron oxide yellow pigments

| Product | Bayferrox (X) | Mapico LL-XLO (Y) | Mapico 1000 HRA (Z) | A | B | C | D | E | F | 1 | 2 | 3 | 4 |
|---|---|---|---|---|---|---|---|---|---|---|---|---|---|
| Colour change temperature (°C.) | 210 | 210 | 240 | 250 | 250 | 250 | 250 | 240 | 250 | 260 | 260 | 260 | 270 |

FIG. 1 illustrates the dependence of the color difference Δa* on the test temperature.

The heat resistance of the yellow pigment may also be tested on the basis of DIN 53,772: "Testing of colouring agents in thermoplastic synthetic materials.

6174 for a color difference compared with the samples produced at the lowest test temperature (200° C.). According to DIN 53,722, the test temperature at which a color difference of $\Delta E^*_{a,b} = 3$ occurs between the samples is the heat resistance of the iron oxide yellow pigment, based on the test medium (polyethylene, Vestolen A 6016). The color differences between the samples and the reference are plotted on a graph against the test temperature in °C. The test temperature in °C. at which the color difference $\Delta E^*_{a,b}=3$ is determined graphically by interpolation and this value is rounded up to the nearer 10° C. According to DIN 53,772, the result obtained is a measure of the heat resistance of the pigment in the selected synthetic resin.

Table 4 shows the heat resistance in °C. determined by graphic interpolation according to DIn 53,772 when the pigment is worked up in the thermoplastic synthetic material Vestolen A 6016.

TABLE 4

Heat resistance according to DIN 53 772 of iron oxide yellow pigments in thermoplastic Vestolen A 6016

| Product | Bayferrox (X) | Mapico LL-XLO (Y) | Mapico 1000 HRA (Z) | A | B | C | D | E | F | 1 | 2 | 3 | 4 | 5 |
|---|---|---|---|---|---|---|---|---|---|---|---|---|---|---|
| Heat resistance in °C. | 220 | 220 | 240 | 250 | 250 | 250 | 240 | 240 | 250 | 270 | 270 | 270 | 270 | 260 |

Figure 2:
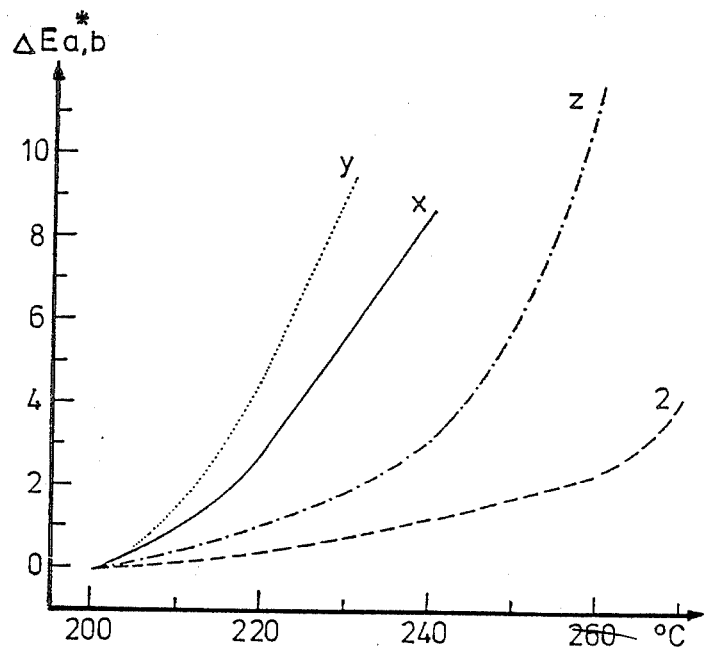

The dependence of the color value $\Delta E^*_{a,b}$ on the test temperature is represented in FIG. 2 (tested in thermoplastic Vestolen ® A 6016).

What is claimed is:

1. Heat resistant iron oxide yellow pigments containing aluminium compounds of the formula $(AlO)_x PO_4 (OH)_{x-3}$ where x is a value from 3 to 10.

2. Heat resistant iron oxide yellow pigments according to claim 1 wherein the quantity of aluminium compound is 7.5 to 25% by weight.

3. Heat resistant iron oxide yellow pigments according to claim 1 wherein the aluminium compound is in the form of a coating on iron oxide.

4. Heat resistant iron oxide yellow pigments according to claim 3 wherein the coating comprises difficultly soluble compounds of Al and P in a molar ratio of Al:P in the range of 3-10, with an Al content of 4.5 to 9% by weight and a P content of 0.6 to 4% by weight.

5. Process for the preparation of heat resistant iron oxide yellow pigments containing aluminium compounds of the formula $(AlO)_x PO_4 (OH)_{x-3}$ where x is a number from 3 to 10 which process comprises applying said aluminum compounds to an iron oxide yellow pigment by precipitation, hydrothermal synthesis, grinding or spraying of the aluminium compounds on the iron oxide yellow pigment.

6. Process according to claim 5 wherein a coating is formed by precipitation, hydrothermal treatment, grinding or spraying of the aluminium compounds on iron oxide yellow pigment.

7. Process according to claim 5 wherein the method of preparation is by precipitation or hydrothermal synthesis.

8. Process according to claim 6 wherein the coating is formed by dry or wet grinding.

9. Process according to claim 6 wherein the method of coating is by precipitation or hydrothermal synthesis.

10. Process according to claim 9 wherein the coating is formed by precipitation with sodium aluminate used as the Al source and orthophosphoric acid as the P source.

11. In an improved pigmented stoving lacquer, the improvement comprises a heat resistant iron oxide yellow pigment according to claim 1.

12. In an improved colored thermoplastic syntehtic material, the improvement comprises a heat resistant iron oxide yellow pigment according to claim 1 as the coloring agent.

* * * * *